(12) United States Patent
Hunter

(10) Patent No.: US 8,373,289 B2
(45) Date of Patent: *Feb. 12, 2013

(54) ENERGY GENERATING MODULES WITH FUEL CHAMBERS

(75) Inventor: Jefferey Allen Hunter, Troy, OH (US)

(73) Assignee: F3 & I2, LLC, Troy, OH (US)

( * ) Notice: Subject to any disclaimer, the term of this patent is extended or adjusted under 35 U.S.C. 154(b) by 726 days.

This patent is subject to a terminal disclaimer.

(21) Appl. No.: 12/559,118

(22) Filed: Sep. 14, 2009

(65) Prior Publication Data

US 2010/0230414 A1 Sep. 16, 2010

Related U.S. Application Data

(63) Continuation-in-part of application No. 12/205,421, filed on Sep. 5, 2008, now Pat. No. 7,589,429, which is a continuation of application No. PCT/US2008/072096, filed on Aug. 4, 2008.

(60) Provisional application No. 60/970,417, filed on Sep. 6, 2007.

(51) Int. Cl.
*F02B 63/00* (2006.01)

(52) U.S. Cl. ............................................ 290/1 A; 123/2

(58) Field of Classification Search .................. 290/1 R, 290/1 A, 4 R, 6, 43, 54, 2, 40 R; 123/2, 3
See application file for complete search history.

(56) References Cited

U.S. PATENT DOCUMENTS

| | | | |
|---|---|---|---|
| 1,779,786 A | 10/1930 | Unzue | |
| 1,950,234 A | 3/1934 | Ewertz | |
| 2,601,634 A | 6/1952 | Rivette | |
| 2,927,711 A | 3/1960 | Naggiar | |
| 3,781,139 A | 12/1973 | Lohse | |
| 3,948,314 A | 4/1976 | Creswick et al. | |
| 4,136,432 A | 1/1979 | Melley, Jr. | |
| 4,548,164 A | 10/1985 | Ylonen et al. | |
| 4,644,705 A | 2/1987 | Saccomani et al. | |
| 4,732,360 A | 3/1988 | Bodenheimer | |
| 4,992,669 A | 2/1991 | Parmley | |
| 5,181,541 A | 1/1993 | Bodenheimer | |
| 5,187,945 A | 2/1993 | Dixon | |
| 5,197,627 A | 3/1993 | Disabato et al. | |
| 5,316,174 A | 5/1994 | Schutz | |
| 5,363,787 A | 11/1994 | Konopasek et al. | |
| 5,435,270 A | 7/1995 | Newman | |
| 5,460,013 A | 10/1995 | Thomsen | |
| 5,609,037 A | 3/1997 | Fischler | |
| 5,642,827 A | 7/1997 | Madsen | |
| 5,651,330 A | 7/1997 | Jewett | |
| 5,739,675 A | 4/1998 | Green et al. | |
| 5,744,940 A | 4/1998 | Colton et al. | |

(Continued)

FOREIGN PATENT DOCUMENTS

CH 642418 A5 4/1984
DE 10045921 A1 3/2002

(Continued)

*Primary Examiner* — Nicholas Ponomarenko
(74) *Attorney, Agent, or Firm* — Dinsmore & Shohl LLP

(57) ABSTRACT

A fuel module comprises an enclosure and a fuel chamber. In one exemplary embodiment, the fuel chamber comprises a primary containment tank contained within a secondary containment tank. The enclosure comprises a plurality of exterior enclosure walls and a plurality of interior enclosure walls that cooperate to form the secondary containment tank such that the primary containment tank is disposed between the exterior enclosure walls and the interior enclosure walls. In another exemplary embodiment, the exterior enclosure walls and the interior enclosure walls cooperate to form a single-walled fuel chamber disposed between the exterior and interior enclosure walls of the fuel module. Additional exemplary embodiments include fuel chambers configured as any multiple-wall structures, whether double-wall, triple-wall, or other, that comprise a plurality of containment tanks.

22 Claims, 6 Drawing Sheets

U.S. PATENT DOCUMENTS

| | | | |
|---|---|---|---|
| 5,755,349 A | 5/1998 | Brundle | |
| 5,804,946 A | 9/1998 | Gaubatz et al. | |
| 6,206,252 B1 | 3/2001 | Broadus | |
| 6,216,957 B1 | 4/2001 | Turunen, Jr. | |
| 6,393,775 B1 | 5/2002 | Staschik | |
| 6,422,018 B1 | 7/2002 | Tisdale et al. | |
| 6,520,124 B2 | 2/2003 | Bohm, II | |
| 6,601,542 B2 | 8/2003 | Campion | |
| 6,615,741 B2 | 9/2003 | Fecko et al. | |
| 6,973,947 B2 | 12/2005 | Penaloza et al. | |
| 7,081,682 B2 | 7/2006 | Campion | |
| 7,351,485 B2 | 4/2008 | Shioya | |
| 7,589,429 B2* | 9/2009 | Hunter | 290/1 A |
| 7,619,319 B1* | 11/2009 | Hunter | 290/4 R |
| 8,207,621 B2* | 6/2012 | Hunter | 290/1 A |
| 2005/0184000 A1 | 8/2005 | Jowett | |
| 2006/0279976 A1 | 12/2006 | Witten et al. | |
| 2009/0066091 A1* | 3/2009 | Hunter | 290/1 A |
| 2010/0050564 A1* | 3/2010 | Hunter | 52/745.02 |
| 2010/0060016 A1* | 3/2010 | Hunter | 290/1 R |
| 2010/0060093 A1* | 3/2010 | Hunter | 310/89 |
| 2010/0192908 A1* | 8/2010 | Hunter | 123/434 |

FOREIGN PATENT DOCUMENTS

| | | |
|---|---|---|
| EP | 0428113 A1 | 5/1991 |
| EP | 0485978 A1 | 5/1992 |
| EP | 0594226 A2 | 4/1994 |
| FR | 2129215 A5 | 10/1972 |
| FR | 2558806 A1 | 8/1985 |
| WO | 9525053 A1 | 9/1995 |
| WO | 2004052755 A1 | 6/2004 |
| WO | 2007027130 A1 | 3/2007 |
| WO | 2007091270 A2 | 8/2007 |

* cited by examiner

ENERGY GENERATING MODULES WITH FUEL CHAMBERS

CROSS-REFERENCE TO RELATED APPLICATIONS

The present application is filed under 35 U.S.C. 111(a) as a continuation-in-part of U.S. patent application Ser. No. 12/205,421 filed Sep. 5, 2008 (U.S. Pat. No. 7,589,429), which is a continuation of International Patent Application No. PCT/US08/72096, which international application designates the United States and claims the benefit of U.S. Provisional Application Ser. No. 60/970,417, filed Sep. 6, 2007.

BACKGROUND

Conventional power generating systems generally are used to generate electric power either in remote areas where access to electricity is limited or in urban areas to provide backup power during power outages. More particularly, such conventional systems typically utilize a diesel engine to generate the needed electric power, which may be used for both prime (primary source) and backup (redundant source) power. Power generating systems commonly are used for industrial, construction, mining, oil and gas exploration, and other commercial applications. For example, for industrial applications, the systems may be used to support prime and/or backup electric power for factories; for construction, mining, and oil and gas exploration applications, the systems may be used to generate prime power for the operation of equipment, given that the locations of such activities often are too remote and distant from municipal power grids; and, for commercial applications, the systems may provide backup electric power for electrical systems should the municipal power grid temporarily lose power due to a storm, natural disaster, sabotage, etc.

Power generating systems typically generate significant amounts of noise, are very expensive, and may be transportable from one location to another. As such, power generating systems generally are enclosed in order to reduce the amount of noise escaping to the surrounding outside environment, to protect the engine and other components from theft and environmental conditions, and to facilitate their transportation. A common enclosure for power generating systems are standard shipping containers, such as ISO (International Organization for Standardization) shipping containers. Enclosure of power generating systems within such containers enables the systems to be easily and rapidly deployed to variously located job sites. Another common enclosure for power generating systems are drop-over enclosures that may be designed in a variety of dimensions and configurations. Drop-over enclosures typically are used for power generating systems intending to have a fixed location, such as atop a commercial building.

Depending upon the unique customer requirements, which, in large part, may be dictated by federal, state, and local laws, additional equipment may be needed to operate and support the power generating systems. This equipment may include, but is not limited to, the following: DC lighting systems, electrical controls such as switchgear or a voltage changeover board, sound attenuation, fire suppression systems, personnel doors, fuel tank, louvers for ventilation, and an exhaust system. With the footprint of the enclosure often being constrained, due to the power generating system's proximity to buildings, equipment, etc., designers of power generating systems may seek to minimize the dimensions of internal components of the power generating system, including the engine, such that the overall footprint of the enclosure may be minimized. Alternatively, when using a standard shipping container, the outside dimensions are fixed. Therefore, all of the required components must be sized so as to fit inside of the container.

Power generating systems using liquid fuels, such as petroleum-based fuels, may present problems in attempting to minimize sizes of necessary components. For not only must fuel tanks meet all federal, state, and local laws, but fuel tanks must also fulfill the engine's fuel supply requirements within the available space of the enclosure. Therefore, there is a desire to maximize the size of the fuel tank in order reduce the frequency of necessary and costly re-fuelings of the power generating system that competes with the desire to minimize the size of the power generating modules and their components.

Further, conventional fuel tanks are designed and built in cylindrical, square, and rectangular shapes as discrete components connected to the engine via tubes and hoses. Given the size and shape of existing liquid fuel engines most commonly used, designers generally must install the fuel tank in the nose (front), in the tail (rear), or beneath the engine. If the fuel tank is to meet Underwriters Laboratories' standards for fuel containment, then the fuel tank must be double-walled such that if an exterior wall is pierced, an uncompromised interior wall prevents the fuel from leaking. Also, conventional fuel tanks may create uneven surfaces within interiors of the power generating systems, particularly in workspace areas. For example, if a fuel tank is positioned below the engine, its exterior walls may create a trip hazard and/or create uneven floor or wall surfaces, making it more difficult for a designer to optimize space within the interior of the power generating system.

SUMMARY

Embodiments of the present invention relate generally to energy generating modules. More particularly, embodiments relate generally to energy generating modules that comprise an enclosure, an energy generating device, and a fuel chamber, wherein exterior walls and interior walls of the enclosure cooperate to form the fuel chamber such that the fuel chamber is disposed between the exterior and interior enclosure walls.

In accordance with one embodiment, a fuel module comprises an enclosure and a fuel chamber. The fuel chamber comprises a primary containment tank contained within a secondary containment tank. The primary containment tank of the fuel chamber comprises one or more cells configured to contain fuel. The enclosure comprises a plurality of exterior enclosure walls and a plurality of interior enclosure walls. The exterior enclosure walls and the interior enclosure walls cooperate to form the secondary containment tank of the fuel chamber such that the primary containment tank is disposed between the exterior enclosure walls and the interior enclosure walls.

In accordance with another embodiment, an energy generating module comprises an enclosure, a fuel chamber, one or more sealable ports, and one or more fuel sensors. The fuel chamber comprises a primary containment tank contained within a secondary containment tank. The enclosure comprises a plurality of exterior enclosure walls and a plurality of interior enclosure walls. The exterior enclosure walls and the interior enclosure walls cooperate to form the secondary containment tank of the fuel chamber such that the primary containment tank is disposed between the exterior enclosure walls and the interior enclosure walls. The primary containment tank of the fuel chamber comprises one or more cells configured to contain fuel. The fuel sensors are positioned in the interstitial spaces and in one or more of the cells of the primary containment tank to sense a presence of fuel in the cells and a leaking of fuel from the cells into the interstitial spaces. The sealable ports permit passage of fuel across the exterior enclosure walls and the primary containment tank for inserting or withdrawing fuel in the cells of the primary containment tank.

In accordance with yet another embodiment, an energy generating module comprises an enclosure and one or more sealable ports. The enclosure comprises a plurality of exterior enclosure walls and a plurality of interior enclosure walls, the exterior enclosure walls and the interior enclosure walls cooperate to form a fuel chamber disposed between the exterior and interior enclosure walls. The fuel chamber comprises one or more cells configured to contain fuel. The sealable ports permit passage of fuel across the exterior enclosure walls for inserting or withdrawing fuel in the cells of the fuel chamber.

BRIEF DESCRIPTION OF THE DRAWINGS

The following detailed description of specific embodiments can be best understood when read in conjunction with the following drawings, where like structure is indicated with like reference numerals and in which.

Figure 1:
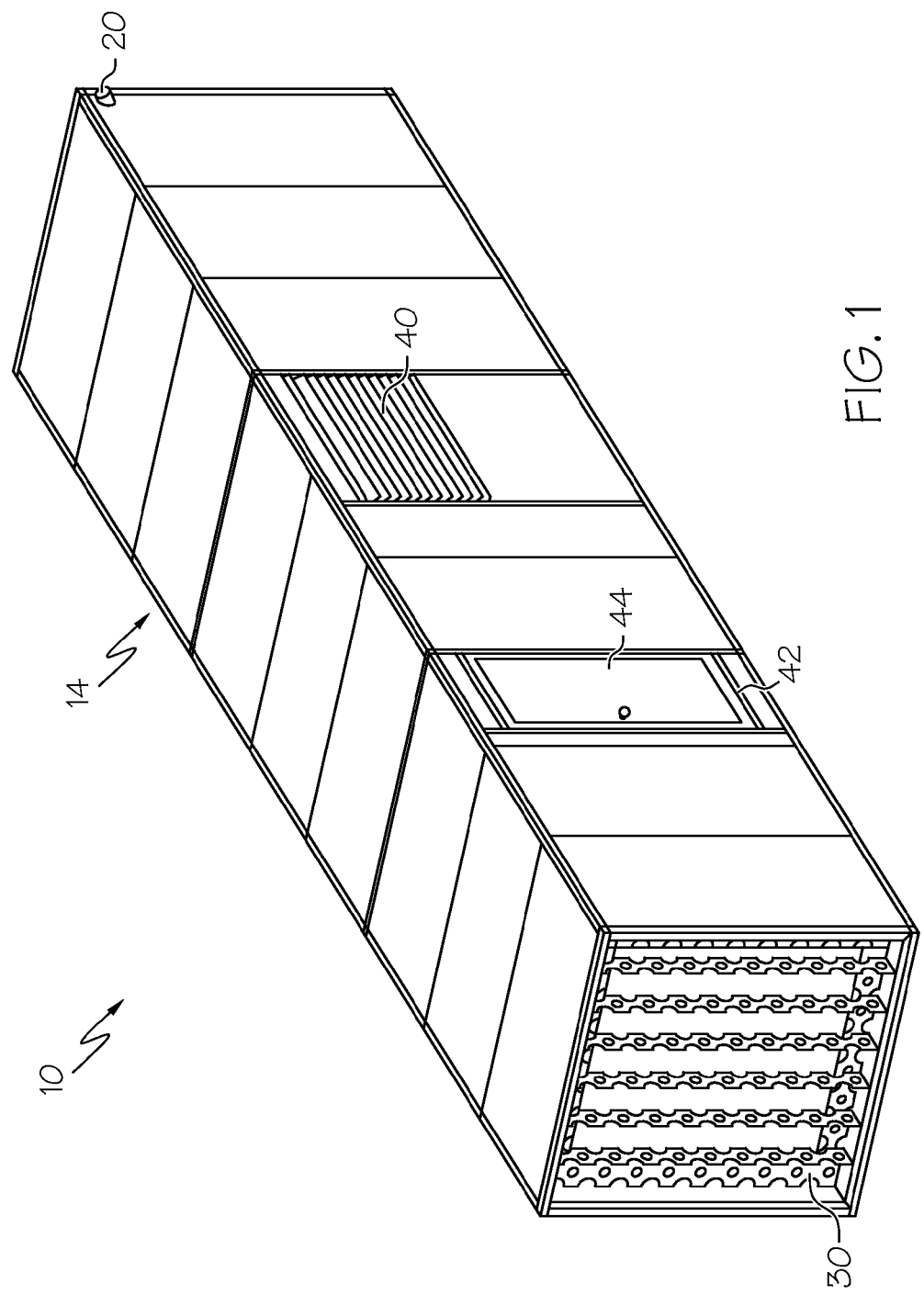
FIG. 1 is an illustration of a perspective view of a power generating module with baffles exposed at one end of a power generating module according to one or more embodiments.

The embodiments set forth in the drawings are illustrative in nature and are not intended to be limiting of the embodiments defined by the claims. Moreover, individual aspects of the drawings and the embodiments will be more fully apparent and understood in view of the detailed description.

DETAILED DESCRIPTION

Embodiments of the present invention relate generally to energy generating modules. These energy generating modules comprise an enclosure, an energy generating device, and a fuel chamber. The energy generating device may utilize fuel contained in the fuel chamber to generate an energy output. For example, but not by way of limitation, the energy generating device may be a generator engine that generates electric power output, a boiler that generates heat and/or warm air output, a chiller that generates cool air output, an air compressor that generates forced air output, or any other energy generating device configured to generate or otherwise produce an energy output. Solely for purposes of simplifying the description of various embodiments of the present invention, the disclosure provided herein relates primarily to energy generating modules being power generating modules that comprise a power generating device configured to generate electric power with fuel receive from its fuel chamber. As such, the disclosure provided herein is not limited to power generating modules and may be applied to any energy generating module, as described herein. Further, as used herein, the term "module" refers to any configurable enclosure, whether transportable or fixed at a location, capable of enclosing an energy generating device to produce an energy output for any variety or combination of uses, or capable of storing goods or providing a habitable space.

In some embodiments, the energy generating module may not include an energy generating device, thereby providing the flexibility for a user to add or change one or more energy generating devices to the energy generating module as needed. The energy generating modules described herein may also be utilized to store equipment, parts or other goods, as well as fuel to power external engines, vehicles or other devices. These embodiments may also be generally referred to herein as fuel modules.

Referring initially to FIGS. 1-6, a power generating module 10 generally comprises a power generating device 12, an enclosure 14, one or more sealable ports 20, and a fuel chamber 22/38. The power generating device 12 generally, but not necessarily, is a fuel-driven engine configured to generate electric power. The power generating device 12 may be, for example, a turbine engine, a reciprocating engine, an electric/gasoline (or other hybrid) engine, a combined heat and power engine (CHP), which may be used to direct the heat generated by the engine to a nearby facility for a productive use, a hydrogen fuel cell engine, a solar-powered engine, or a wind-driven engine. In fact, the power generating module 10 may comprise one or more of any combination of power generating devices 12 to enhance flexibility and/or energy generation of the power generating module 10. With respect to the exemplary wind-driven engine embodiment, wind turbines, for example, may be mounted onto the enclosure 14 to generate electric power, whether during transportation or while the power generating module 12 is stationary. With respect to the exemplary solar-powered engine, solar panels, for example, may be provided to the roof and/or sides of the enclosure 14 to generate electric power. The power generating module 10 may comprise a battery or other charge-storing device such that electric power generated by the power generating device 12 may be discharged at a later time. The power generating device 12 is enclosed by the enclosure 14 of the power generating module 10 and generally may be accessed only by authorized personnel.

The enclosure 14 may be any structure having a roof, a floor, a pair of sidewalls, and a pair of end-walls that, when connected, provide a chamber-like interior capable of enclosing the power generating device 12, and various other components associated with generating electric power, and of serving as a workspace for personnel. As such, the enclosure 14 may be, for example, an ISO container, a drop-over enclosure, a railway freight car, a modular home, a mobile trailer, or any other enclosure or container configured to perform the purposes described herein. The enclosure 14 may be configured of any variety of different materials, such as, but not limited to, fiberglass, aluminum, stainless steel, carbon steel, or FRP (fiberglass-reinforced plastic). While the enclosure 14 generally may be configured of carbon steel, any alternative material suitable for performing the tasks described herein and in the art may be utilized. Further, the enclosure 14 may be attached directly to a chassis system to facilitate transportation of the power generating module 10 over roads or rails.

As shown in FIGS. 2-5, the enclosure 14 of the power generating module 10 generally comprises a plurality of exterior enclosure walls 16 and a plurality of interior enclosure walls 18, the exterior enclosure walls 16 defining an exterior of the power generating module 10 and the interior enclosure walls 18 defining an interior of the power generating module 10. These exterior and interior enclosure walls 16, 18 define, respectively, the exterior and interior roof, floor, sidewalls, and endwalls of the enclosure 14 of the power generating module 10. While the exterior and interior enclosure walls 16, 18 generally are linear, it is contemplated that one or more of these walls 16, 18 may be curved. Thereby, the interior of the power generating module 10, the exterior of the power generating module 10, or both, may assume a circular or semi-circular, or otherwise curved shape. Curved walls may enhance the ability of the enclosure 14 to reduce the noise emanating from the power generating device 12 that escapes the enclosure 14 to the surrounding outside environment. Further, curved walls may comprise one or more channels to substantially direct noise though specially designed ports to minimize the amount noise projected to the outside environment. The exterior and interior walls 16, 18, whether linear or curved, or combinations thereof, cooperate to form at least a portion of the fuel chamber 22/38 of the power generating module 10.

The fuel chamber 22/38 of the power generating module 10 is configured as an intra-wall hermetically sealed fuel chamber disposed between exterior and interior walls 16, 18 of the enclosure 14. More particularly, the fuel chamber 22/38 may utilize the existing exterior and interior walls 16, 18 (roof, floor, sidewalls, and endwalls) of the enclosure 14 of the power generating module 10 as one or more walls of the fuel chamber 22/38—whether a double-walled fuel chamber 22 or single-walled fuel chamber 38, as described in greater detail herein. Additional embodiments of fuel chambers are contemplated wherein the fuel chambers are configured as any multiple-wall structures, whether double-wall, triple-wall, or other, that comprise a plurality of containment tanks.

Creating a multipurpose role for the exterior and interior enclosure walls 16, 18 (as well as internal walls 50, 54 described below) offers greater flexibility in designing the fuel chamber 22/38 and the power generating module 10, reduces the materials and labor required to build a fuel chamber 22/38, provides additional sound attenuation due to less exterior enclosure wall space being exposed to sources of noise (i.e., the power generating device 12, etc.), and eliminates trip hazards when compared with conventional power generating system fuel tanks having perpendicular joints exposed in the interior workspace of the enclosure. With conventional fuel tanks, material, such as carbon steel, is aligned and welded together to achieve a desired size and shape of the fuel tank. For conventional double-walled fuel tanks, another exterior wall is welded together and about an internal fuel tank. This increases both the labor costs and the amount of material necessary in constructing the conventional fuel tanks. The present embodiments of the fuel chamber 22/38 utilize the existing exterior and interior walls 16, 18 (roof, floor, sidewalls, and/or endwalls) of the enclosure 14 to form the fuel chamber 22/38, thereby reducing the amount of, time, material, and labor expended in construction. Also, the configuration of embodiments of the present power generating module 10 with the intra-wall fuel chamber 22/38, and fuel contained therein, that may substantially surround the interior of the module 10, and the power generating device 12 stored therein, may provide significant sound attenuation of the noise generated by the power generating device 12. Thereby, baffles and/or other sound-deafening materials positioned about an exterior of a power generating system and/or the power generating device, as commonly found in the art, is not needed, saving additional time, material, labor, and money involved in construction.

Further, the fuel chamber, both double-walled 22 and single-walled 38 embodiments, potentially provide significantly more cubic space for fuel containment given the amount of square feet along all six walls of the enclosure 14 can provide significantly more fuel capacity when compared to conventional power generating system fuel tanks. Therefore, depending upon the rate of fuel consumption, the runtime of the power generating module 10 in generating electric power may increase significantly and may require far fewer re-fueling trips for a fuel tanker and manpower to re-fuel the power generating module 10 in comparison to conventional power generating system fuel tanks.

Figure 4:
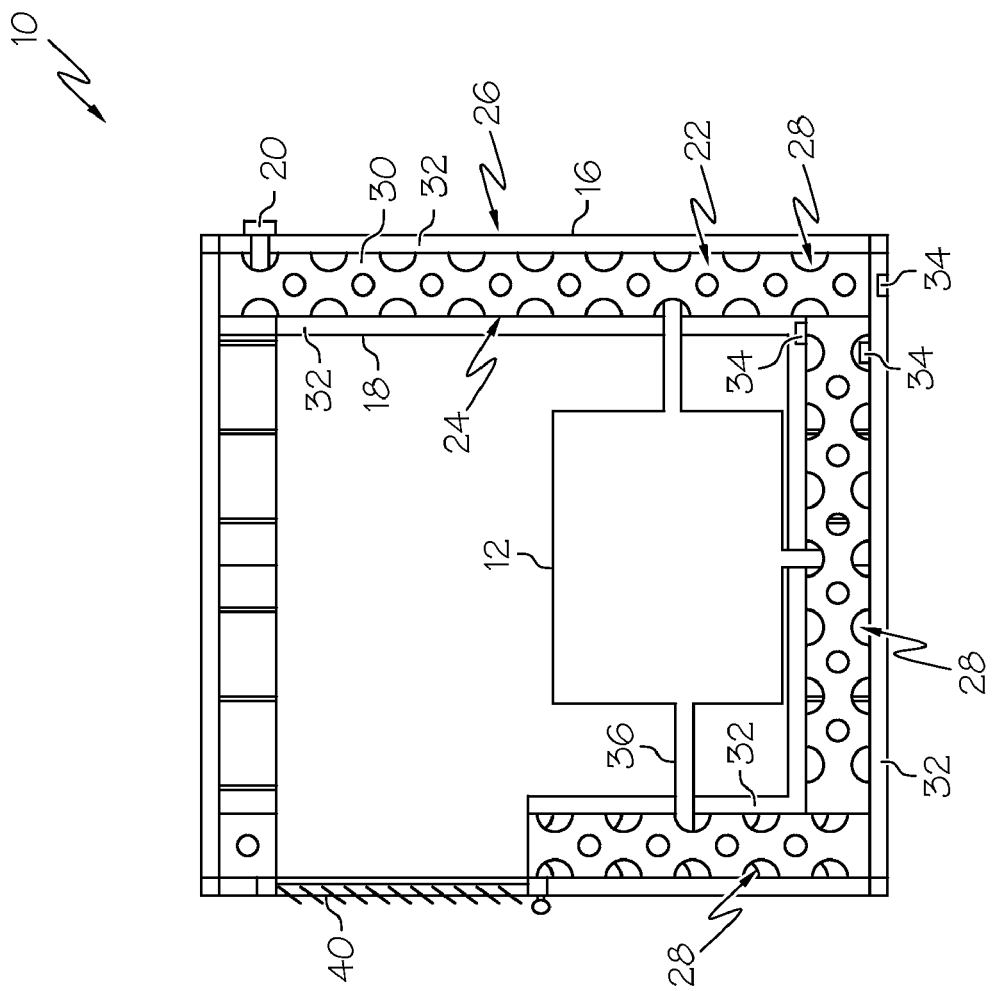
FIG. 4 is an illustration of a cross-sectional end view of a power generating module according to one or more embodiments.
Figure 5:
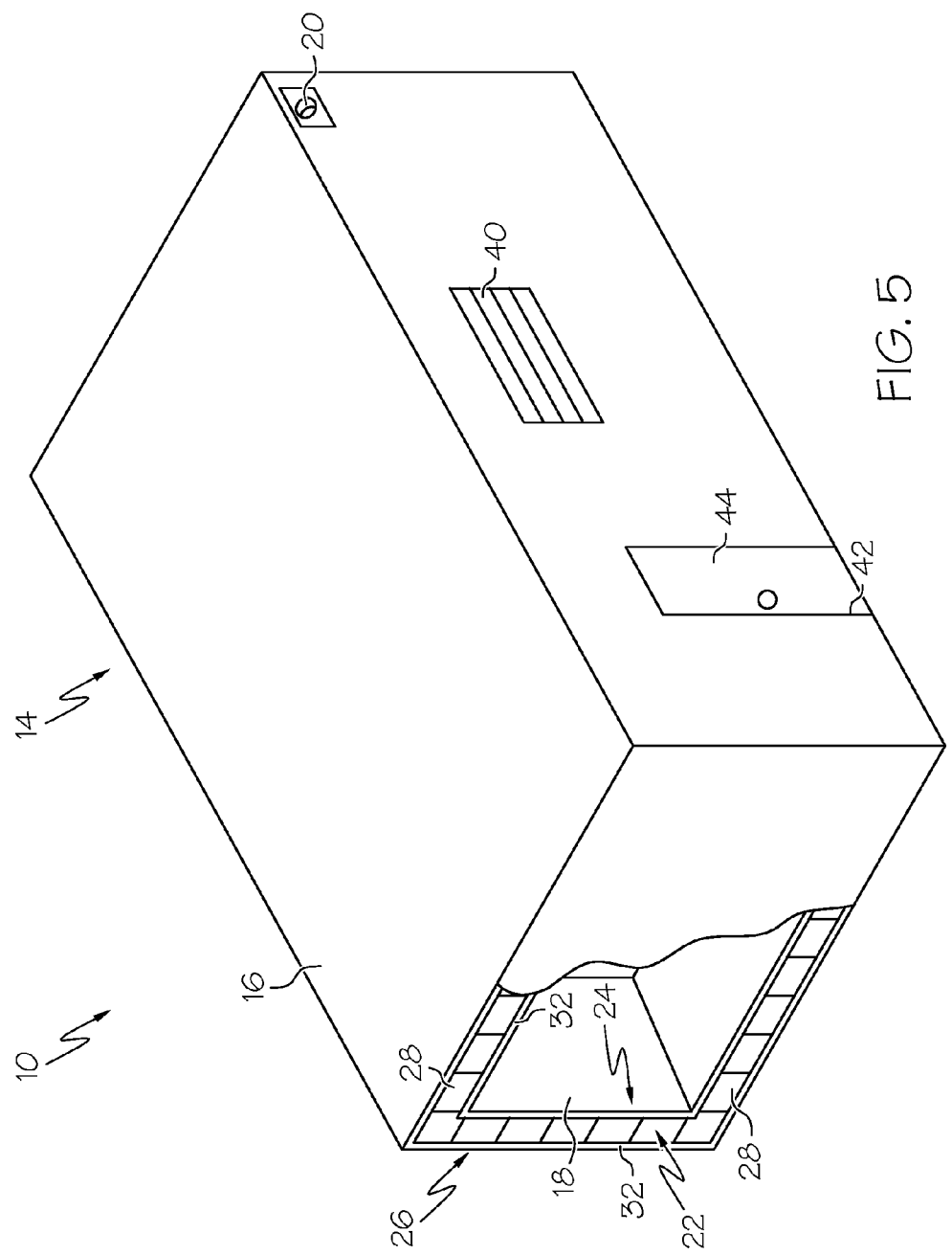
FIG. 5 is an illustration of a partial cross-sectional perspective view of a power generating module according to one or more embodiments.

As shown in FIGS. 4 and 5, the fuel chamber 22 of the power generating module 10 may comprise a primary containment tank 24 contained within a secondary containment tank 26. This may be referred to herein as a double-walled fuel chamber 22. The primary containment tank 24 may comprise one or more cells 28 configured to contain fuel. The exterior enclosure walls 16 and the interior enclosure walls 18 cooperate to form the secondary containment tank 26 of the fuel chamber 22. Thereby, the primary containment tank 24 is disposed between the exterior and interior of the power generating module 10, or, more particularly, between the exterior and interior enclosure walls 16, 18, of the enclosure 14. The thickness of the primary and secondary tanks 24, 26 generally is determined in accordance with the amount of fuel to be contained therein.

Figure 2:
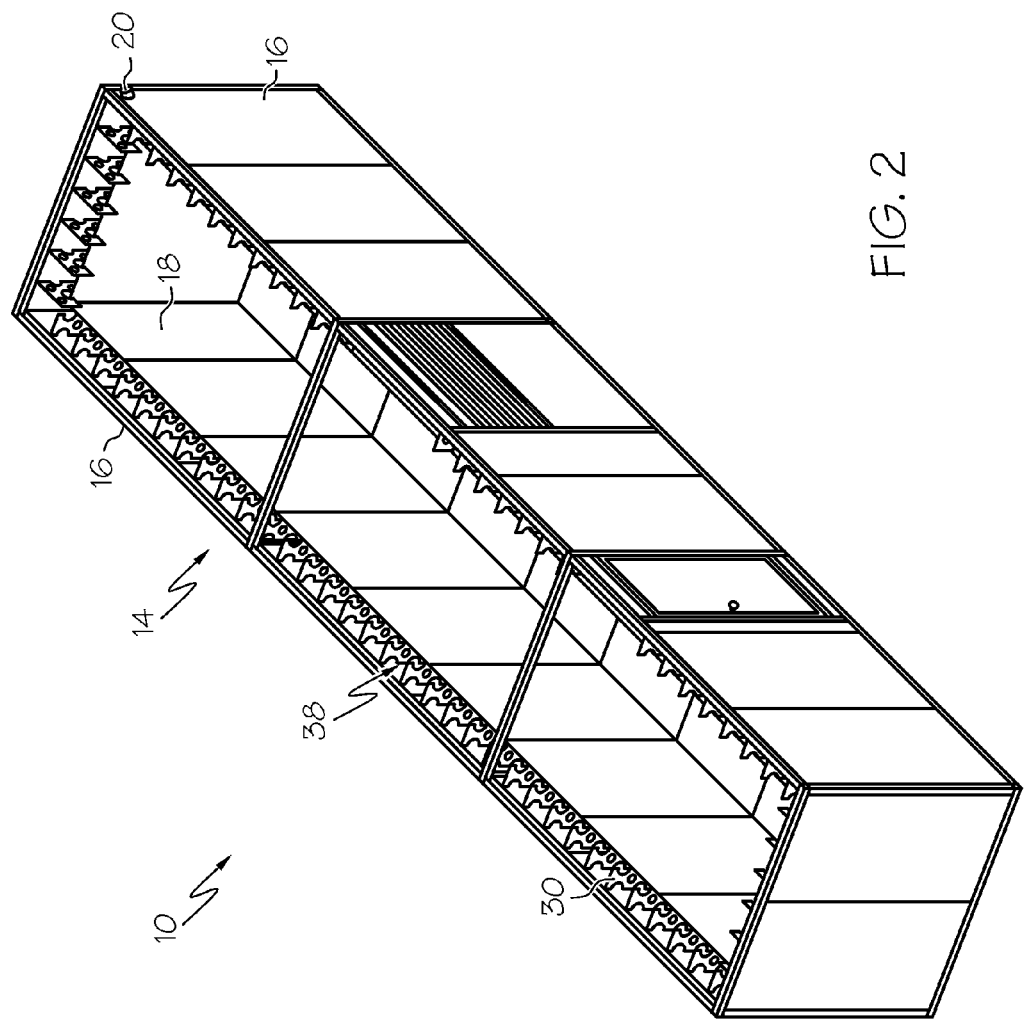
FIG. 2 is an illustration of a perspective view of a power generating module with an exposed interior of a power generating module according to one or more embodiments.

Alternatively, as shown in FIG. 2, the fuel chamber 38 of the power generating module 10 may be a single-walled fuel chamber 38 formed through the cooperation of the exterior and interior enclosure walls 16, 18, as opposed to the fuel chamber 22 described above comprising a primary containment tank 24 contained within a secondary containment tank 26. More particularly, in the exemplary embodiment shown in FIG. 2, the exterior and interior enclosure walls 16, 18 cooperate to form a single-walled fuel chamber 38. Thereby, the single-walled fuel chamber 38 is disposed between the exterior and interior enclosure walls 16, 18 of the power generating module 10. Similar to the double-walled fuel chamber 22, the single-walled fuel chamber 38 also may comprise one or more cells configured to contain fuel.

Figure 3:
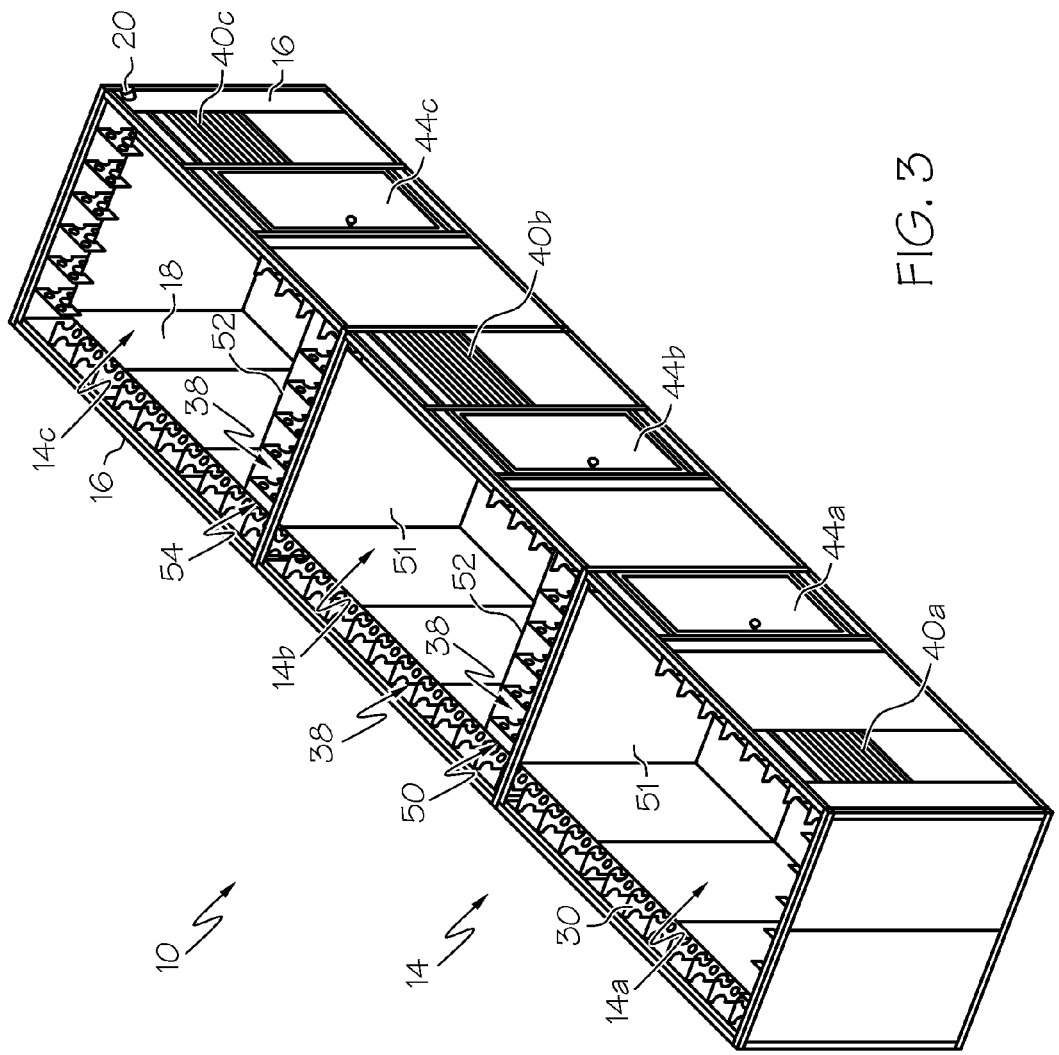
FIG. 3 is an illustration of a perspective view of a power generating module with an exposed interior of a power generating module having internal walls therein according to one or more embodiments.

Additionally, the enclosure 14 may also have one or more sets of internal walls that may subdivide the enclosure 14. FIG. 3 illustrates an exemplary power generating module 10 having two sets of internal walls 50, 54. Each set of internal walls 50, 54 further comprises a first internal wall 51 and a second internal wall 52. Similar to the external and interior walls 16, 18 described above, the first and second internal walls 51, 52 define an internal section of the fuel chamber 22/38, thereby increasing the volume thereof. The internal section of the fuel chamber 22/38 defined by the first and second internal walls 51, 52 may be in fluid communication with the sections of the fuel chamber 22/38 defined by the exterior and interior walls 16, 18. The internal walls 50, 54 may be of single-walled, doubled-walled and/or multiple-walled configurations as described above.

The internal walls 50, 54 may also subdivide the enclosure 14 into separate enclosure sections 14a-14c that may be used for any number of purposes. For example and not limitation, a first type of energy generating device may be enclosed in enclosure section 14a, a second type of energy generating device may be enclosed in enclosed section 14b, and a living quarters or storage space may be maintained in enclosure section 14c. A plurality of doors 44a-44c and louvers 40a-40c may also be provided to provide access and ventilation to the enclosure sections 14a-14c.

In some embodiments, the exterior and interior walls may be defined by assembled modular panels configured to hold fuel and form the enclosure 14. Complementary modular panels may be interconnected to form an enclosure 14 for the energy generating device 10 or other stored equipment or goods. "Modular" panels are panels that can interconnect in a variety of configurations, for a variety of purposes, to form part or all of an enclosure 14. For example, modular panels can simply serve as multi-purpose wall panels suitable for use in any part of an enclosure wall or, at a more sophisticated extreme, can serve as wall panels in different parts of an enclosure wall, as ceiling panels in different parts of an enclosure ceiling, as louver panels, window-abutting panels, door panels, corner panels, floor panels, etc. As an example and not a limitation, the modular panels may be configured as the modular panels disclosed in U.S. patent application Ser. No. 12/205,442.

With respect to the double-walled fuel chamber 22, the primary and secondary containment tanks 24, 26 may be separated by one or more interstitial spaces 32. The width of the interstitial space 32 between the primary and secondary containment tanks 24, 26 may be determined by regulations or industry standards. While the primary containment tank 24 may be hermetically sealed to substantially preclude fuel leakage therefrom, leakage may occur due to a manufacturing defect in the power generating module 10, a compromising of the exterior and interior enclosure walls 16, 18 from collision with or puncturing by a foreign object, or other reason. As such, the interstitial spaces 32 may be configured to collect fuel that may leak from the primary containment tank 24. It is also contemplated that the secondary containment tank 26 may also be hermetically sealed so as to substantially preclude fuel leakage from the interstitial spaces 32 across the exterior and/or interior enclosure walls 16, 18.

In addition, one or more of the interstitial spaces 32 may be at least partially filled with concrete, insulation, or other matter to further attenuate noise emanating from the power generating device 12 and to restrict the puncturing of both the primary and secondary containment tanks 24, 26 with a foreign object. This insulating matter may be further configured or provided in such a way within the interstitial spaces 32 to permit a flow of fuel therethrough so as not to obstruct fuel from appropriate sensing by the power generating module 10, as described in greater detail below. The interstitial spaces 32 may also permit the storage of other materials, such as batteries or other goods. The term "goods" is defined as any item that may be used or consumed, such as equipment, food, clothing, tools, batteries, etc. Further, dimensions of the interstitial spaces 32 may be maintained by a brace that may be welded perpendicularly to the walls of the primary and secondary containment tanks 24, 26 (i.e. the exterior and interior enclosure walls 16, 18). This brace may be configured to support these walls and to allow fuel to pass therethrough should there be a leak in the primary containment tank 24.

In some embodiments portions of the exterior and interior enclosure walls 16, 18 may be made of a transparent material such as tempered glass or plastic, for example, so that at least some external light may enter the enclosure 14. The transparent portions of the walls 16, 18 may provide a means for fuel level detection (i.e., a sight glass) without the need for an electronic or mechanical fuel gauge. Further, depending on the type of fuel stored within the fuel chamber 22/38, the transparent portions may enable light to enter the enclosure 14.

As shown in FIG. 4, the power generating module 10 may comprise one or more fuel sensors 34 positioned in the interstitial spaces 32 to sense a presence of fuel therein due to a leak in the primary containment tank 24. The interstitial spaces generally are configured to direct fuel collected therein to a position of the fuel sensor for sensing. Also, the power generating module 10 may comprise one or more fuel sensors in the cells 28 of the primary containment tank 24 or in the cells of the single-walled fuel chamber 38 to sense levels of fuel contained therein and to notify an operator of the power generating module 10 of a need to re-fuel.

The cells 28 within the primary containment tank 24 and the cells within the single-walled fuel chamber 38 may be configured to contain, cumulatively or independently, any desirable amount of fuel. In one exemplary embodiment, the cells 28 in the primary containment tank 24 are configured to contain cumulatively about 1,500 gallons of fuel in a 20 foot standard ISO container having a double-walled fuel chamber 22 with about 150% containment, whereas, a conventional fuel tank in a 20 foot standard ISO container generally holds only about 750 gallons and, thus, provides only about 50% of the runtime of the power generating device in comparison to the present exemplary embodiment. Further, in another exemplary embodiment, the cells 28 are configured to contain cumulatively about 3,000 gallons of fuel in a 40 foot standard ISO container having a double-walled fuel chamber 22 with about 150% containment, whereas, a conventional fuel tank in the same sized container generally holds only about 1,500 gallons. In addition, with respect to additional exemplary embodiments of double-walled fuel chambers 22 that provide about 200% containment, the cells 28 may be configured to contain cumulatively about 1,100 gallons of fuel in a 20 foot standard ISO container or about 2,200 gallons of fuel in a 40 foot standard ISO container. Conversely, conventional fuel tanks generally hold only about 550 and 1,100 gallons of fuel in 20 foot and 40 foot standard ISO containers, respectively. Therefore, embodiments of double-walled fuel chambers 22 may provide about 200% of the fuel storage capacity generally available with conventional fuel tanks. It is anticipated that embodiments of single-walled fuel chambers 38 described herein may provide even greater than 200% of the fuel storage capacity generally available with conventional fuel tanks as a limiting factor to fuel storage capacity for conventional fuel tanks is their respective heights, which, with the fuel tanks being confined within an interior space of the enclosure, is restricted by the height of the interior workspace within the enclosure.

In addition, not only may the primary containment tank 24 and the single-walled fuel chamber 38 be hermetically sealed, as described above, but, also, the cells respective to the primary containment tank 24 and the single-walled fuel chamber 38 may be individually hermetically sealed so as to substantially preclude fuel leakage between the cells and from the cells into the interstitial spaces 32 or across the exterior enclosure walls 16. Two or more of the cells may also be fluidly interconnected such that fuel may flow through the interconnected cells. In addition, one or more cells of the fuel chambers 22/38 of one power generating module 10 may be connected to one or more cells of the fuel chambers 22/38 of another nearby power generating module 10. Thereby, a plurality of interconnected power generating modules 10 may be provided to produce a greater, cumulative electric power output than available through a single, isolated power generating module 10. For example, but not by way of limitation, multiple adjacent power generating modules 10 in fluid communication and all configured to and capable of sharing fuel contained in their respective fuel chambers 22/38 through fuel conveying devices, such as hoses, tubes, valves, clamps, etc., may be provided. Further, it is contemplated that power generating modules 10 supported on chassis or railcars for purposes of transportation may be connected to a tanker truck or tanker railcar that may contain several thousand gallons of fuel in addition to that contained in the fuel chambers 22/38.

Further, the cells may be supported internally by a plurality of baffles 30 intermittently welded or continuously welded inside of the cells, as shown in FIGS. 1-4. The baffles 30 may be configured to maintain predefined dimensions of the cells. The baffles 30 may be perforated so as to permit passage of fuel therethrough. Further, the baffles 30 may be configured and/or positioned within the cells to further attenuate noise emanating from the power generating device 12. Sound insulating matter, such as, but not limited to concrete, insulation, or other matter, may also be provided internally to the cells to provide additional noise attenuation benefits while not significantly interfering with a flow of fuel within the cells.

As mentioned above, the power generating module 10 also comprises one or more sealable ports 20. The sealable ports 20 may be configured to permit passage of fuel across the exterior enclosure walls 16 and the primary containment tank 24 for inserting or withdrawing fuel in the cells of the primary containment tank 24 and the single-walled fuel chamber 38. The sealable ports 20 generally are positioned above a maximum level of fuel contained in the cells so as to preclude leakage of fuel to outside of the enclosure 14 through the sealable ports 20. It is contemplated, however, that the sealable ports 20 may be positioned at any location on the power generating module 10. In an embodiment where a sealable port 20 is positioned beneath a maximum level of fuel contained in the cells, the sealable port 20, the fuel chamber 22/38, or both, may be configured to prevent, or substantially prevent, fuel from flowing back into and/or through the sealable port 20, thereby precluding leakage of fuel to outside of the enclosure 14 through the sealable port 20.

The provision of multiple sealable ports 20 to the power generating module 10 offers greater re-fueling flexibility, if access to a sealable port 20 is obstructed or otherwise prevented, and may reduce the time necessary for re-fueling. It is contemplated that where multiple, independent cells are within the primary containment tank 24 or the single-walled fuel chamber 38, a sealable port 20 may be provided to each cell. Thereby, in such embodiments, the independent cells may be filled simultaneously with a common fuel or with various types of fuel, further reducing the time necessary to re-fuel the power generating module 10. Further, with respect to re-fueling a power generating module 10, it is contemplated that the fuel may be delivered and provided by any variety of fuel sources. For example, the fuel may be provided by a tanker trailer or a tanker railcar that is transported to the location of the power generating module 10. By way of another example, the power generating module 10 itself may be transported to a fuel station or a stationary or immobilized tanker to which the power generating module 10 may couple to receive fuel.

Further, the power generating module 10 may comprise one or more fuel conveying devices 36 for conveying fuel from the cells of the primary containment tank 24 and the single-walled fuel chamber 38 to the power generating device 12. Thereby, the power generating device 12 enclosed within the interior of the power generating module 10 is in fluid communication with the cells via the fuel conveying devices 36. The power generating device 12 may then generate electric power with fuel received from the cells by the fuel conveying devices 36. The fuel conveying devices 36 may include, but are not limited to, one or more tubes, hoses, clamps, valves, seals, and/or other additional or similar devices.

In addition, the power generating module 10 may comprise a normal vent and an emergency vent. The primary containment tank 24 and the exterior enclosure wall 16 of the single-walled fuel chamber 38 generally have located on their respective top surfaces both normal and emergency vents that may be used to automatically relieve internal gaseous pressure. The secondary containment tank 26 generally has located at its top surface an emergency vent to relieve excessive pressure that has developed within primary and secondary containment tanks 24, 26 often due to external fire exposure or blockage of the normal vent.

Further, it is contemplated that a substantially impenetrable coating or other material may be applied to one or more walls of a fuel chamber or tank that may render the need for double walls, interstitial spaces, and/or secondary tanks unnecessary. More particularly, the coating may substantially prevent projectiles or other foreign objects from piercing the wall of a fuel chamber or tank. This coating, if applied to the walls of a fuel chamber or tank, may eliminate the need for the secondary containment and any protective or insulating material provided therein. This further reduces materials, time, labor, and costs of construction of power generating modules 10 and permits expansion of the fuel chamber to larger dimensions for increased storage of fuel in lieu of the interstitial spaces. The coating may be applied as a liquid that dries to a substantially impenetrable material about the walls of the fuel chamber or tank. Alternatively, the coating may be a material affixed or otherwise provided about the walls of the fuel chamber or tank while in its impenetrable condition, such as in a slab or packaged configuration. It is also contemplated that the coating may assist in attenuating noise generated by the power generating device 12.

Fuel utilized by the power generating module 10 and contained in the cells in the fuel chambers 22/38 may be contained in a compressed or a non-compressed state. In addition, fuel utilized by the power generating module 10 and contained in the cells in the fuel chambers 22/38 is not limited to any particular fuel type. Rather, the fuel may be, but is not limited to, any petroleum-based fuel, such as gasoline, propane, diesel, jet fuel, kerosene, or liquefied natural gas, any biofuel, or hydrogen. In some embodiments, the fuel chamber 22/38 and/or portions of the enclosure 14 may be pressurized such that energy requiring pressurization such as gasses may be stored within the power generating module 10. For example, refrigerants may be stored within one or more cells of the fuel chamber 22/38 in an embodiment of the power generating module that utilizes a chiller or cooler. It is contemplated that any pressurized gas or energy source may be stored within the fuel chamber 22/38 and/or portions of the enclosure 14.

As described above, individually sealed cells of the fuel chambers 22/38 may contain different types of fuels. This permits not only electric power generation, but also re-fueling of vehicles that utilize various fuel types. In accordance with embodiments configured to permit refueling of vehicles with fuel dispensed from a fuel chamber 22/38 of a power generating module 10, the power generating module 10 may comprise one or more fuel dispensing receptacles in fluid communication with the fuel in the fuel chamber 22/38 and configured to be applied to a vehicle for dispensing fuel into the vehicle's fuel tank. Fuels used to supply a vehicle may include, but are not limited to, gasoline, diesel, bio-fuel, and hydrogen. Thereby, not only may a power grid or other electrical system be powered by the power generating device 12, but a vehicle utilizing any one of a variety of fuel types may be re-fueled with fuel in the fuel chamber 22/38 at the same power generating module 10. Embodiment may also comprise one or more energy-transfer receptacles to charge and/or power external equipment. For example, energy-transfer receptacles may be provided to charge the batteries or other energy sources of a vehicle or power an electric motor or other device. Multiple energy-transfer receptacles may be provided such that multiple vehicles or other types of equipment may be charged/powered concurrently or charge more quickly than with a single energy-transfer receptacle. For example, an electric vehicle may be configured to receive electrical power from a plurality of sources to reduce charge time. Rather then one large battery system that may require a lengthy period of time in which to replenish (e.g., twenty four hours), the electric vehicle may be configured to have twelve battery systems that may be independently charged within a relatively shorter period of time (e.g., two hours). The power generating module 10 may include several energy-transfer receptacles to connect to all twelve battery systems, for example. Embodiments may utilize any conventional or yet-to-be-developed configuration of fuel dispensing and energy-transfer receptacles. As an example, the fuel dispensing and energy transfer receptacles may be configured as those disclosed in U.S. patent application Ser. No. 12/205,437.

In addition, the storage of various fuel types also enables the power generating device 12 of the power generating module 10 to be powered by one or more of any variety of fuel types to generate electric power. As discussed above, multiple energy generating devices may be provided within a energy or power generating module 10. The sealed and separated fuel cells may enable a first type of energy generating device, such as a diesel engine, for example, to be in fluid communication with a first type of fuel, and a second energy generating device, such as a chiller, for example, to be in fluid communication with a second type of fuel. It should be understood that more than two types of fuel and energy generating devices may be provided within the power generating module 10. In this manner, embodiments of the power generating device 10 may provide fuel to different types of equipment having different fuel requirements.

With the power generating module 10 comprising a power generating device 12 and a fuel chamber 22/38, along with other components necessary for the generation of electric power, the power generating module 10 is self-contained and is independent of any outside resources, with the exception of re-fueling the fuel chamber 22/38, that may be needed to generate and discharge electric power and/or fuel. Thereby, the power generating module 10 may operate independently of personnel, outside of occasional temporary maintenance, refueling, power grid connection/disconnection, and transportation of the power generating module 10. Remaining operations of the power generating module 10 may be self-performed by the power generating modules 10 or may be controlled and/or monitored remotely. With respect to the re-fueling of vehicles, according to one exemplary embodiment, vehicle operators may park their vehicles along side a power generating module, couple a fuel dispensing receptacle of the power generating module to their vehicles, and dispense fuel from the fuel tank of the power generating module 10 to the vehicle for refueling purposes. Further, the power generating modules 10 may be configured such that vehicle operators may to transact fuel purchases through credit card or other payment transactions, eliminating the need for personnel on site to handle payment arrangements. For example, but not by way of limitation, vehicle operators may swipe a credit cards in a card-reading mechanism affixed to and/or linked with the power generating module 10 to pre-pay for the fuel, as currently offered at most fueling stations.

As mentioned above, the power generating module 10 generally comprises components in addition to the power generating device 12 that may be necessary for, or facilitative of, electric power generation. These additional components may include, but are not limited to: an alternator, a battery or other charge storing device, DC lighting systems, electrical controls such as engine switchgear or a voltage changeover board, sound attenuation, fire suppression systems, personnel doors, fuel tank, louvers for ventilation, fan cooling system, and an exhaust system. Any combination of these items may be considered to be a power generating module 10. The exhaust system may be configured to include environmentally-friendly scrubbers to remove, or substantially remove, toxic or harmful substances from the exhaust generated by the power generating device 12 of the power generating module 10, such as NOx. Further, for construction of the power generating module 10, the power generating device 12, alternator, electrical controls, air circulation, exhaust systems, and other components may be manufactured in and/or provided by separate facilities. Once constructed and appropriately configured, the power generating device 12 may be placed within an interior of the power generating module 10.

Further, the enclosure 14 of the power generating module 10 may be configured to enclosure and support a modular cage. This modular cage may be configured to stably support the power generating device 12, and possibly other components positioned within the interior of the enclosure 14, such as but not limited to, a radiator and an alternator integrated into the power generating device 12, during transportation of the power generating module 10 over roads or rails. More particularly, the power generating device 12 may be supportedly affixed to the cage with the assembly thereof being placed into the interior of the enclosure 14. The cage may support the power generating device 12 such that while the cage is secured within the interior of the enclosure 14, the power generating device 12 may sway within the boundaries of the cage so as to be self-leveling with the movement of the power generating module 10 during transportation. By way of example only, the cage may function similarly to a gyroscope in maintaining stability through adjustable self-leveling. In addition, or alternative thereto, the cage may comprise an independent suspension within the interior of the enclosure 14 to provide self-leveling capabilities to the cage and the power generating device 12. As such, the modular cage may protect the power generating device 12, and any other components supported by the cage, from damage during transportation, may substantially reduce tilting of a trailer or rail car transporting the power generating module 10. The modular cages may be designed to fit securely within, and according to the dimensions of, an interior of an enclosure 14. In addition, the cages may be designed for repeated, rapid insertion and withdrawal to and from an interior of an enclosure 14. For example, one or more guide rails may be secured to the flooring of the interior of the enclosure 14 to receive and lock into place modular cage containing a power generating device 12 and electronic controls. Such features of the module cage permit greater flexibility of the power generating modules 10 and the use of its components, which may be interchangeable within enclosures 14 and power generating modules 10, assuming a "plug-and-play" configuration.

As shown in FIGS. 1-5, the power generating module 10 may also comprise louvers 40 for ventilation, a doorway 42, and a door 44 for access to the internally enclosed power generating device 12. More particularly, portions of the exterior and interior enclosure walls 16, 18 of the enclosure 14 may comprise a plurality of closable louvers 40 and a doorway 42 for personnel to access the power generating device 12. In addition to the louvers 40, the power generating modules 10 may also comprise a fan cooling system to cool the power generating device 12. The louvers 40 and/or the cooling system may be configured to draw air in from a roof, ends, and/or sides of the enclosure 14. Such configurations may ensure that there is sufficient air flow to support and cool the power generating device 12 and assist with exhaust. Further, such configurations may adequately cool an interior workspace area of the enclosure 14 to permit access by personnel.

Further, while the chambers 22/38 described herein are referred to as "fuel chambers," it is contemplated that the chambers may be used for purposes other than, or in addition to, containing fuel. In fact, the chambers may be used to contain any fluid, liquid or gas. In addition, the chambers may provide hollow spaces accessible from the interior and/or exterior of the enclosure 14 in which various goods and/or supplies may be stored. Also, the chambers may contain insulation for temperature regulating purposes and/or insulation or other material for sound attenuation or reduction purposes. Further, for example, it is contemplated that some chambers may contain fuel, while other chambers within the same enclosure 14 contain insulation, sound reduction panels, supplies, a ladder to facilitate access to the interior of the enclosure, batteries, water, human or mechanical waste, and/or may be internally divided into distinct cells that contain one or more of the above, or other goods, and any combinations thereof.

It is contemplated that two or more power generating modules 10 may be situated side-by-side or in near locations, whether on adjacent trailer chassis, on a concrete pad or other ground surface, or on a single or multiple railway cars. The provision of multiple power generating modules 10 in a single location may enable the continuous provision of electric power when a power generating module 10 is inoperable due to re-fueling, maintenance, or other reason, and the simultaneous provision of electric power, whether individually, in various combinations, or cumulatively by the multiple power generating modules 10. Further, when situated on a single or multiple railway cars, the power generating modules 10 may be situated side-by-side, stacked on top of each other, or both, to facilitate transportation of the modules 10 and to provide greater and/or more versatile electric power output with multiple power generating modules 10.

A plurality of energy generating modules 10 that are spread over a geographic area (e.g., a power generating module, fuel module, etc.) may be electrically coupled together via one or more network monitoring stations to form a network. Conditions of the coupled energy generating modules 10 may be monitored and controlled by the network monitoring stations, which may comprise a general purpose computer configured to receive and transmit data to and from the plurality of energy generating modules or other dedicated hardware and software. The conditions of the energy generating modules 10 monitored by the network monitoring station may comprise any variety of conditions related to energy transfer, operation, use, performance, other conditions, and combinations thereof. The network may be configured as the energy generating module network disclosed in U.S. patent application Ser. No. 12/205,437, for example. It is contemplated that other network configurations may also be utilized.

Figure 6:
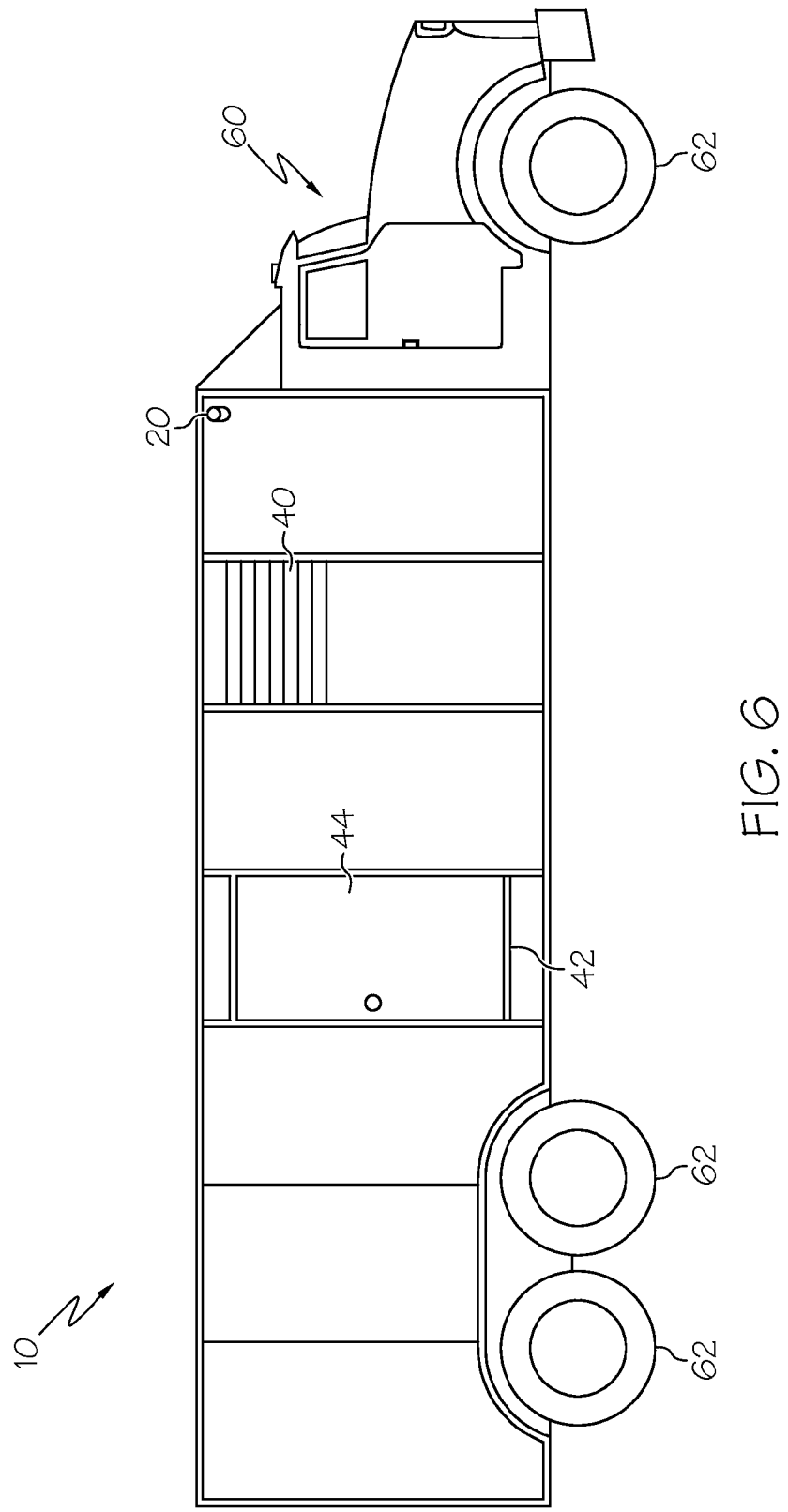
FIG. 6 is an illustration of a power generating module having a drive train according to one or more embodiments.

To further facilitate transportation of the power generating modules 10, in some embodiments the power generating module 10 may be equipped such that the module 10 may be driven and easily transported to a variety of locations. FIG. 6 illustrates an exemplary power generating module 100 with an incorporated drive train 60. The drive train 60 may be an engine system and associated cab (e.g., a truck) configured such that the power generating module 100 may be driven to a desired location. The drive train 60 may have its own source of fuel (e.g., a dedicated fuel tank) or draw on the fuel contained in the fuel chamber(s) 22/38.

Having a drive train 60 incorporated into the power generating module 100 may eliminate the need for the power generating module to be towed by a tractor such as a semi-truck, and may also speed the delivery of the power generating module to the desired location. For example, during an emergency situation, such as a natural or man-made disaster, for example, semi-trucks and trailers capable of transporting a power generating module 10 may be in high-demand and short supply. A fleet of power generating modules 100 having an associated drive train 60 may be quickly deployed to the disaster site to provide energy to the disaster victims and support personnel. Further, embodiments of the power generating module 100 may be driven to a refueling location rather then requiring a fueling truck to be driven to the power generating site, which may reduce refueling costs.

Although the embodiment illustrated in FIG. 6 comprises a drive train 60, vehicular embodiments are not limited thereto. For example, the power generating module 10 may comprise integrated axles and wheels such that the module 10 may be towed by a tractor. Having integrated axles and wheels eliminates the need to secure a trailer to transport the power generating module 10, which may reduce deployment time. Additionally, the power generating module 10 may further comprise integrated skids and/or skis having a substantially flat surface such that the module 10 may be driven or towed in snowy conditions.

Further, it is contemplated that not only may the power generating modules 10 be used for industrial, construction, mining, oil and gas exploration, and commercial applications, as described herein, but the power generating modules 10 may be used for marine applications as well. More particularly, a power generating module 10 may be positioned on a dock, wharf, or other water-side location such that the module 10 may provide electric power to a ship, boat, or other water vessel to charge an energy storage device of the vessel or to re-fuel the vessel with a fuel contained within the fuel chamber 22/38 of the module 10. In addition, a power generating module 10 may be placed on-board of a water vessel to provide prime or back-up electric power for the vessel and/or for fuel for vehicles also on-board of the vessel. Further, a power generating module 10 may be secured to a floatation device for transportation over water, which may enable the power generating module 10 to be transported to a location that is not easily accessible by land. The floatation device may be any device capable of supporting a power generating module 10, such as an inflatable floatation device, a pontoon style boat, or outrigger raft, for example.

A power generating module 10 may also be configured as a habitable enclosure for persons to live, work and perform other activities. For example, the enclosure 14 may define a livable space having a bed, furniture, plumbing, lighting, electrical systems, cooking equipment, etc. The power generating module 10 may be configured as an emergency trailer that provides emergency shelter, a mobile home, a module home, a prefabricated home, etc. The power generating modular 10 may be used solely for sheltering individuals or it may also be used to both generate power with a power generating device as well as shelter people and/or store goods. Power generating modules 10 defining a livable space may be beneficial to persons working in remote locations as they may provide shelter as well as fuel and power.

It should be noted that embodiments of the fuel chamber 22/38 described herein do not attempt to improve upon existing fuel containment regulations, standards, or guidelines, such as the Underwriters Laboratories Inc.'s standards (see UL 142 and 2085). Further, it is contemplated that the power generating modules 10 and the fuel chambers 22/38 may be configured and manufactured in accordance with UL standards 142, 2085, and/or any other standards, regulations, or guidelines.

It is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that terms like "generally" and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A fuel module comprising an enclosure and a fuel chamber, wherein:
   the fuel chamber comprises a primary containment tank contained within a secondary containment tank, the primary and secondary containment tanks separated by one or more interstitial spaces;
   the primary containment tank of the fuel chamber comprises one or more cells configured to contain fuel;
   the enclosure comprises a plurality of exterior enclosure walls and a plurality of interior enclosure walls; and
   the exterior enclosure walls and the interior enclosure walls cooperate to form the secondary containment tank of the fuel chamber such that the primary containment tank is disposed between the exterior enclosure walls and the interior enclosure walls.

2. The fuel module of claim 1, wherein the cells of the primary containment tank are individually hermetically sealed such that the fuel module is configured to contain more than one type of fuel.

3. The fuel module of claim 1, wherein the fuel module is configured to enclose goods.

4. The fuel module of claim 1, wherein at least a portion of the exterior enclosure walls and the interior enclosure walls is transparent.

5. The fuel module of claim 1 further comprising a fuel dispensing receptacle in fluid communication with at least some of the cells within the primary containment tank.

6. The fuel module of claim 1 further comprising a first energy generating device, wherein the first energy generating device is enclosed by the interior enclosure wall of the enclosure, is in fluid communication with the cells of the primary containment tank, and is configured to generate an energy output with fuel received from the cells.

7. The fuel module of claim 6, wherein the first energy generating device comprises a power generating device configured to generate electrical power.

8. The fuel module of claim 7 further comprising a plurality of energy-transferring receptacles coupled to the power generating device.

9. The fuel module of claim 6 further comprising an additional energy generating device, wherein the additional generating device is enclosed by the interior enclosure wall of the enclosure, is in fluid communication with the cells of the primary containment tank, and is configured to generate an energy output with fuel received from the cells.

10. The fuel module of claim 9, wherein:
    at least some of the cells of the primary containment tank are individually hermetically sealed such that one or more cells of the fuel module is configured to contain a first fuel type and one or more cells of the fuel module is configured to contain a second fuel type; and
    the first energy generating device is in fluid communication with the cells configured to contain the first fuel type; and
    the additional energy generating device is in fluid communication with the cells configured to contain the second fuel type.

11. The fuel module of claim 1, wherein the cells are configured to contain one or more of the following: gasoline, propane, diesel, jet fuel, kerosene, liquefied natural gas, biofuel, hydrogen, human waste, pressurized gas, and water.

12. The fuel module of claim 1 further comprising one or more sealable ports, wherein the sealable ports permit passage of fuel across the exterior enclosure walls and the primary containment tank for inserting or withdrawing fuel in the cells of the primary containment tank.

13. The fuel module of claim 1 further comprising one or more first internal walls and one or more second internal walls positioned within the enclosure, wherein the first and second internal walls cooperate to form an internal section of the secondary containment tank of the fuel chamber such that an internal portion of the primary containment tank is disposed between the first and second interior walls.

14. The fuel module of claim 1, wherein the enclosure defines a livable space.

15. The fuel module of claim 1 is configured to be driven from a first location to a second location.

16. The fuel module of claim 1 further comprising a drive train.

17. The fuel module of claim 1 further comprising at least one substantially flat ski surface positioned on an underside surface of the power generating module.

18. The fuel module of claim 1, wherein one or more of the interstitial spaces are at least partially filled with concrete, insulation, electrical batteries, or other matter.

19. The fuel module of claim 1, wherein the fuel module is electrically coupled to a network comprising at least one additional fuel module.

20. The fuel module of claim 1, wherein the plurality of exterior and interior walls comprises a plurality of modular panels having fuel chambers that are configured to contain fuel.

21. The fuel module of claim 1, further comprising one or more sealable ports, and one or more fuel sensors, wherein:
the fuel chamber comprises a primary containment tank contained within a secondary containment tank;
the enclosure comprises a plurality of exterior enclosure walls and a plurality of interior enclosure walls;
the exterior enclosure walls and the interior enclosure walls cooperate to form the secondary containment tank of the fuel chamber such that the primary containment tank is disposed between the exterior enclosure walls and the interior enclosure walls;
the primary containment tank of the fuel chamber comprises one or more cells configured to contain fuel;
the fuel sensors are configured to sense a presence of fuel; and
the sealable ports permit passage of fuel across the exterior enclosure walls and the primary containment tank for inserting or withdrawing fuel in the cells of the primary containment tank.

22. The fuel module of claim 1, further comprising one or more sealable ports, wherein the sealable ports permit passage of fuel across the exterior enclosure walls for inserting or withdrawing fuel in the cells of the fuel chamber.

* * * * *

UNITED STATES PATENT AND TRADEMARK OFFICE
CERTIFICATE OF CORRECTION

| | |
|---|---|
| PATENT NO. | : 8,373,289 B2 |
| APPLICATION NO. | : 12/559118 |
| DATED | : February 12, 2013 |
| INVENTOR(S) | : Jefferey Allen Hunter |

It is certified that error appears in the above-identified patent and that said Letters Patent is hereby corrected as shown below:

In the Specification

Col. 4, Line 2, "fuel receive" should read --fuel received--;

Col. 5, Line 18, "direct noise though" should read --direct noise through--;

Col. 5, Line 19, "minimize the amount noise" should read --minimize the amount of noise--;

Col. 11, Line 63, "operators may to transact fuel" should read --operators may transact fuel--;

Col. 11, Lines 66-67, "may swipe a credit cards" should read --may swipe a credit card--; and Col. 14, Line 62, "modular 10" should read --module 10--.

Signed and Sealed this
Twenty-fourth Day of September, 2013

Teresa Stanek Rea
*Deputy Director of the United States Patent and Trademark Office*